United States Patent [19]

Mendolia

[11] Patent Number: 5,751,804
[45] Date of Patent: May 12, 1998

[54] AUDIO INPUT FOR FLIP TYPE TELEPHONES

[75] Inventor: Gregory S. Mendolia, Forest, Va.

[73] Assignee: Ericsson, Inc., Research Triangle Park, N.C.

[21] Appl. No.: 742,817

[22] Filed: Oct. 30, 1996

[51] Int. Cl.⁶ ........................................... H04M 1/00
[52] U.S. Cl. ........................................... 379/433; 379/434
[58] Field of Search ........................... 379/433, 428, 379/434, 441; 455/90, 575, 557

[56] References Cited

U.S. PATENT DOCUMENTS 5,197,091  3/1993  Takagi et al. .......................... 379/433

Primary Examiner—Jack Chiang
Attorney, Agent, or Firm—Jenkens & Gilchrist

[57] ABSTRACT

An audio input for flip phones wherein the acoustical openings currently located on the inside edge of the flip are relocated to the outer edge of the flip. The relocation of the openings allow sound to enter the flip through the openings unobstructed by the face of the telephone user while the phone is in use. The relocation of the openings further allowing for enhanced pick up of ambient noise while the telephone flip is in the closed position.

2 Claims, 2 Drawing Sheets

AUDIO INPUT FOR FLIP TYPE TELEPHONES

BACKGROUND OF THE INVENTION

1. Technical Field of the Invention

The present invention pertains in general to audio inputs for telephones and, more particularly, to audio inputs for telephones having a fold out flip in so called flip phones.

2. Description of Related Art

A style of telephone in use today, referred to as a flip phone, incorporates a flip which folds out from the main body of the telephone. This particular type of telephone is especially popular in cellular telephones where there is a desire to make the telephone as small and lightweight as possible. There are currently three types of flips with respect to the use of the flip as an audio input to the telephone. The first type of flip is purely cosmetic and does not function as an audio input to the telephone. The second type of flip incorporates a microphone into the flip for use as the audio input to the telephone. In this type of flip, openings are placed on the inside face of the flip which faces the person using the telephone. The holes are located above the microphone which is located inside the flip to allow sound to enter through the flip and be picked up by the microphone.

In a third type of flip, openings are also placed on the inside face of the flip but no microphone is located within the flip. Instead, an acoustical channel is created from the openings on the inside face of the flip to the point where the flip is attached to the telephone. A second set of openings are placed at this end of the flip and a microphone is placed inside the body of the telephone at the point where the acoustical channel meets the telephone body. In this type of flip sound enters the openings on the inside face of the flip, travels down the acoustical channel, and exits from the second set of openings where the microphone located in the telephone picks up the sound.

A problem arises on very small telephones which use flips. The small physical size of the telephone and the attached flip results in the openings on the inside face of the flip not being positioned near the mouth of the telephone user. Instead, the openings are positioned next to the jaw bone or cheek of the telephone user which tends to muffle the sound entering the openings. A further problem with positioning the openings on the inside face of the flip deals with a telephone feature sometimes referred to as a dynamic buzzer. This feature monitors ambient sound levels when the telephone is not in use. Based on ambient sound levels, the telephone adjusts the ringer or buzzer volume when a call is received to match the ambient sound levels. When a telephone having a flip is not in use, the flip is generally flipped back to a closed position. In this position the inside face of the flip where the openings are located faces the keypad of the telephone resulting in the ambient sound levels being muffled by the body of the telephone. Thus, the dynamic buzzer feature receives incorrect ambient sound levels while the phone is in the closed position. It would be advantageous therefore, to relocate the openings on the flip to a position which eliminates muffling the voice of a telephone user while the phone is in use and further eliminates muffling the ambient sound while the flip is in the closed position.

SUMMARY OF THE INVENTION

The present invention comprises a flip phone wherein the audio openings on the flip are relocated from the inside face of the flip to the edge of the flip. In one embodiment of the present invention a microphone is located inside the flip. In a second embodiment of the present invention a microphone is located in the body of the telephone and an acoustical channel is located inside the flip running from the openings on the edge of the flip to the microphone located in the body of the telephone where additional openings allow sound to exit the acoustical channel.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
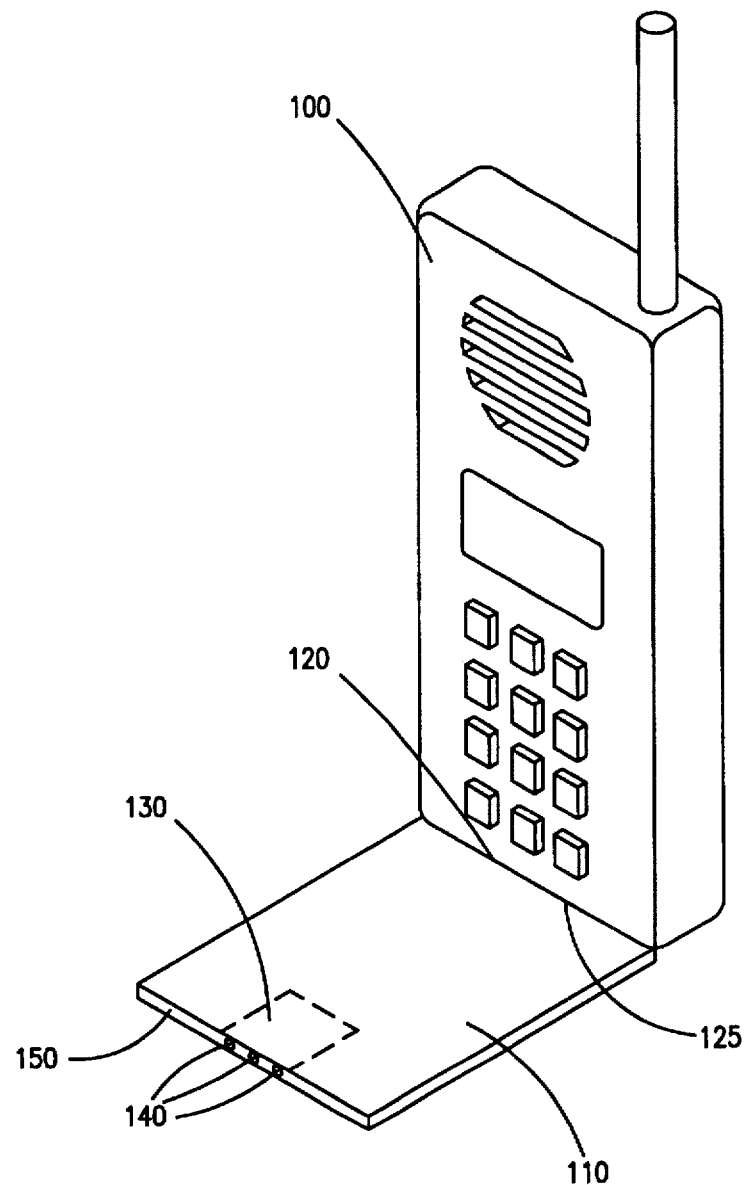
FIG. 1 is a flip phone having audio input openings located on the edge of the flip with a microphone located inside the flip.

Referring now to FIG. 1, there is illustrated a telephone 100 having a flip 110 attached thereto along the bottom edge 120 of the telephone and the inner edge 125 of the flip 110. A microphone 130 is located inside the flip 110 as an audio input to the telephone. By locating the audio openings 140 along the outside edge 150 of the flip 110, the audio openings 140 face toward the mouth of a cellular telephone user while the user is using the telephone. Furthermore, the audio openings 140 no longer face the telephone 100 while the flip 110 is in the closed position. Instead the openings 140 are unobstructed by the telephone 100 thus allowing unimpeded monitoring of ambient noise for use by a dynamic buzzer feature.

Figure 2:
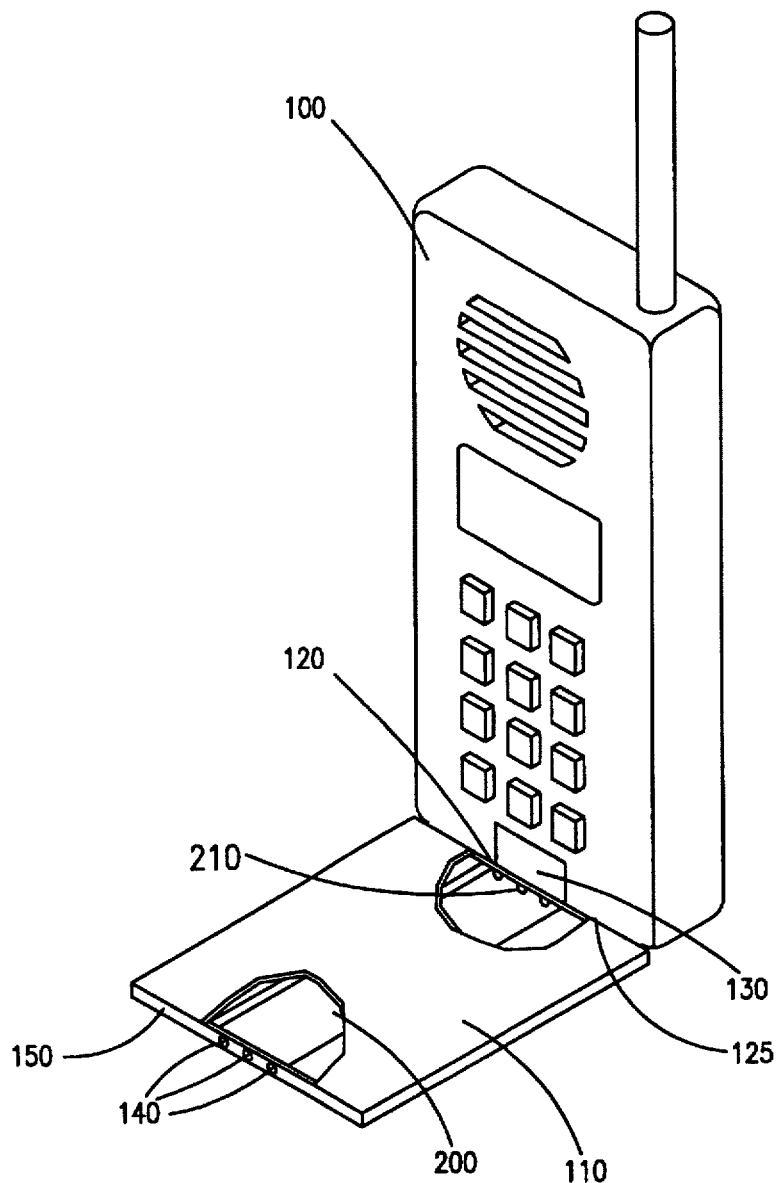
FIG. 2 is a flip phone having audio input openings on the edge of the flip with an acoustical channel running inside the flip from the audio input openings to a microphone located on the body of the telephone.

Referring additionally now to FIG. 2, there is illustrated a telephone 100 having a flip 110 attached thereto along the bottom edge 120 of the telephone and the inside edge 125 of the flip 110. Audio input openings 140 are located on the outside edge 150 of the flip 110. Located inside the flip 110 and running from the openings 140 on the outside edge 150 of the flip 110 to the inside edge 125 of the flip 110 is an acoustical channel 200. A microphone 130 is located on the bottom edge 120 of the telephone where the acoustical channel 200 exits the inside edge 125 of the flip 110. Additional openings 210 are located on the inside edge 125 of the flip 110 to allow sound to exit the acoustical channel 200. Alternatively, the openings 210 can be located on the inside face of the flip 110. In this embodiment of the present invention sound enters the audio openings 140, travels down the acoustical channel 200, and exits additional openings 210 on the inside edge 125 of the flip 110 where the microphone 130 picks up the sound.

Although preferred embodiments of the method and apparatus of the present invention have been illustrated in the accompanying Drawings and described in the foregoing Detailed Description, it is understood that the invention is not limited to the embodiments disclosed, but is capable of numerous rearrangements, modifications, and substitutions without departing from the spirit of the invention as set forth and defined by the following claims.

What is claimed is:

1. An audio input for a telephone comprising:

a rectangular flip attached to the telephone, the flip having a plurality of openings on an outside edge of the flip to allow sound to enter the flip, wherein the outside edge of the flip is perpendicular to an inside face of the flip; and a microphone located within the flip to pick up sound entering the flip through the plurality of openings.

2. An audio input for a telephone comprising:

a rectangular flip attached to the telephone, the flip having a plurality of openings on an outside edge of the flip to allow sound to enter the flip, wherein the outside edge of the flip is perpendicular to an inside face of the flip;

an acoustical channel running through the flip from the openings on the outside edge of the flip to openings on the inside edge of the flip for carrying sound from the plurality of openings on the outside edge; and a microphone located within the telephone to pick up sound carried through the acoustical channel.

* * * * *